United States Patent [19]

Whittaker

[11] Patent Number: 5,727,503
[45] Date of Patent: Mar. 17, 1998

[54] PORTABLE COOLING KENNEL SYSTEM

[76] Inventor: Michael A. Whittaker, 1171 State St., Hanford, Calif. 93230

[21] Appl. No.: 671,004

[22] Filed: Jun. 28, 1996

[51] Int. Cl.⁶ .............................. A01K 1/02; A01K 13/00
[52] U.S. Cl. ...................... 119/500; 119/606; 312/236
[58] Field of Search .................... 119/500, 482, 119/493, 606; 312/236, 210

[56] References Cited

U.S. PATENT DOCUMENTS

| | | | |
|---|---|---|---|
| 2,152,967 | 4/1939 | Martin | 312/236 |
| 3,175,534 | 3/1965 | Pollard | 119/432 |
| 3,531,169 | 9/1970 | Hoffman et al. | 312/236 |
| 4,299,429 | 11/1981 | Franklin, Jr. | 312/236 |
| 4,559,903 | 12/1985 | Bloom et al. | 119/606 |
| 4,753,496 | 6/1988 | Bussard | 312/236 |
| 4,827,872 | 5/1989 | Sommers | 119/500 |
| 5,143,763 | 9/1992 | Hinton | 119/500 |
| 5,154,498 | 10/1992 | Slater | 312/236 |
| 5,216,972 | 6/1993 | Allen, Jr. | 119/500 |
| 5,315,964 | 5/1994 | Mimms et al. | 119/500 |

FOREIGN PATENT DOCUMENTS 2144317  3/1988  United Kingdom .................. 119/500

*Primary Examiner*—Paul J. Hirsch

[57] ABSTRACT

A new Portable Cooling Kennel System for maintaining the temperature within a pet's kennel below a desired level thereby allowing the pet to travel with the owner on long trips, more particularly on airplane flights. The inventive device includes a typical kennel structure comprising a ventilation system, a sliding ice tray slidably projecting within the lower portion of the kennel structure, and at least one ice cartridge storage body for storing ice for cooling of the present invention.

9 Claims, 3 Drawing Sheets

PORTABLE COOLING KENNEL SYSTEM

BACKGROUND OF THE INVENTION

1. Field of the Invention

The present invention relates to Animal Shelter Devices and more particularly pertains to a new Portable Cooling Kennel System for maintaining the temperature within a pet's kennel below a desired level thereby allowing the pet to travel with the owner on long trips, more particularly on airplane flights.

2. Description of the Prior Art

The use of Animal Shelter Devices is known in the prior art. More specifically, Animal Shelter Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Animal Shelter Devices include U.S. Pat. No. 5,349,924; U.S. Pat. No. 4,827,872; U.S. Design Pat. No. 314,251; U.S. Pat. No. 4,962,729; U.S. Pat. No. 5,081,955 and U.S. Pat. No. 5,154,137.

While these devices fulfill their respective, particular objectives and requirements, the aforementioned patents do not disclose a new Portable Cooling Kennel System. The inventive device includes a typical kennel structure comprising a ventilation system, a sliding ice tray slidably projecting within the lower portion of the kennel structure, and at least one ice cartridge storage body for storing ice for cooling of the present invention.

In these respects, the Portable Cooling Kennel System according to the present invention substantially departs from the conventional concepts and designs of the prior art, and in so doing provides an apparatus primarily developed for the purpose of maintaining the temperature within a pet's kennel below a desired level thereby allowing the pet to travel with the owner on long trips, more particularly on airplane flights.

SUMMARY OF THE INVENTION

In view of the foregoing disadvantages inherent in the known types of Animal Shelter Devices now present in the prior art, the present invention provides a new Portable Cooling Kennel System construction wherein the same can be utilized for maintaining the temperature within a pet's kennel below a desired level thereby allowing the pet to travel with the owner on long trips, more particularly on airplane flights.

The general purpose of the present invention, which will be described subsequently in greater detail, is to provide a new Portable Cooling Kennel System apparatus and method which has many of the advantages of the Animal Shelter Devices mentioned heretofore and many novel features that result in a new Portable Cooling Kennel System which is not anticipated, rendered obvious, suggested, or even implied by any of the prior art Animal Shelter Devices, either alone or in any combination thereof.

To attain this, the present invention generally comprises a typical kennel structure comprising a ventilation system, a sliding ice tray slidably projecting within the lower portion of the kennel structure, and at least one ice cartridge storage body for storing ice for cooling of the present invention.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Portable Cooling Kennel System apparatus and method which has many of the advantages of the Animal Shelter Devices mentioned heretofore and many novel features that result in a new Portable Cooling Kennel System which is not anticipated, rendered obvious, suggested, or even implied by any of the prior art Animal Shelter Devices, either alone or in any combination thereof.

It is another object of the present invention to provide a new Portable Cooling Kennel System which may be easily and efficiently manufactured and marketed.

It is a further object of the present invention to provide a new Portable Cooling Kennel System which is of a durable and reliable construction.

An even further object of the present invention is to provide a new Portable Cooling Kennel System which is susceptible of a low cost of manufacture with regard to both materials and labor, and which accordingly is then susceptible of low prices of sale to the consuming public, thereby making such Portable Cooling Kennel System economically available to the buying public.

Still yet another object of the present invention is to provide a new Portable Cooling Kennel System which provides in the apparatuses and methods of the prior art some of the advantages thereof, while simultaneously overcoming some of the disadvantages normally associated therewith.

Still another object of the present invention is to provide a new Portable Cooling Kennel System for maintaining the temperature within a pet's kennel below a desired level thereby allowing the pet to travel with the owner on long trips, more particularly on airplane flights.

Yet another object of the present invention is to provide a new Portable Cooling Kennel System which includes a typical kennel structure comprising a ventilation system, a sliding ice tray slidably projecting within the lower portion of the kennel structure, and at least one ice cartridge storage body for storing ice for cooling of the present invention.

Still yet another object of the present invention is to provide a new Portable Cooling Kennel System that maintains the temperature below a certain level so as to allow the pet to travel on an airplane trip with its owner when the exterior temperature is above a level considered hazardous to the pet's health.

Even still another object of the present invention is to provide a new Portable Cooling Kennel System that ensures the pet's comfort during long trips.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
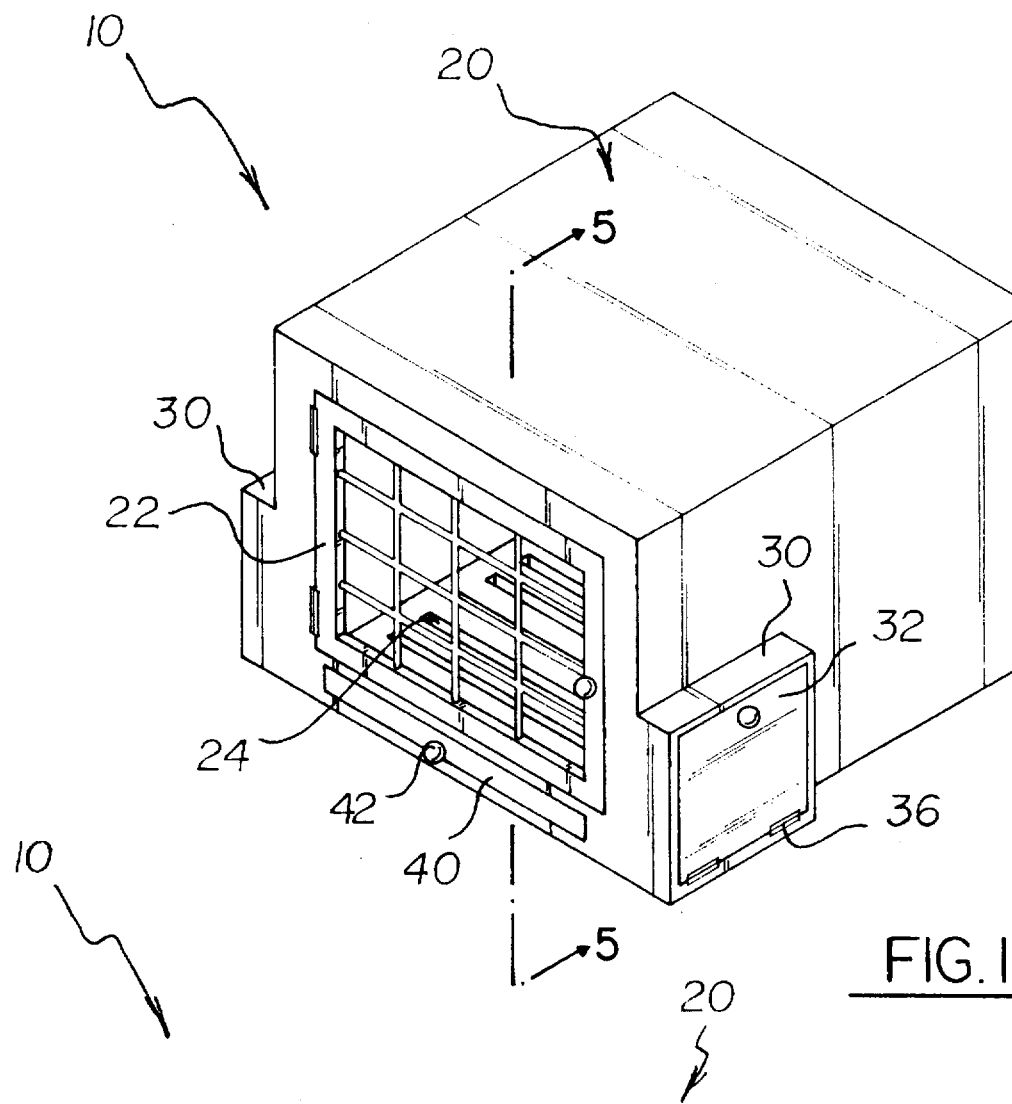
FIG. 1 is a right side perspective view of a new Portable Cooling Kennel System according to the present invention.
Figure 2:
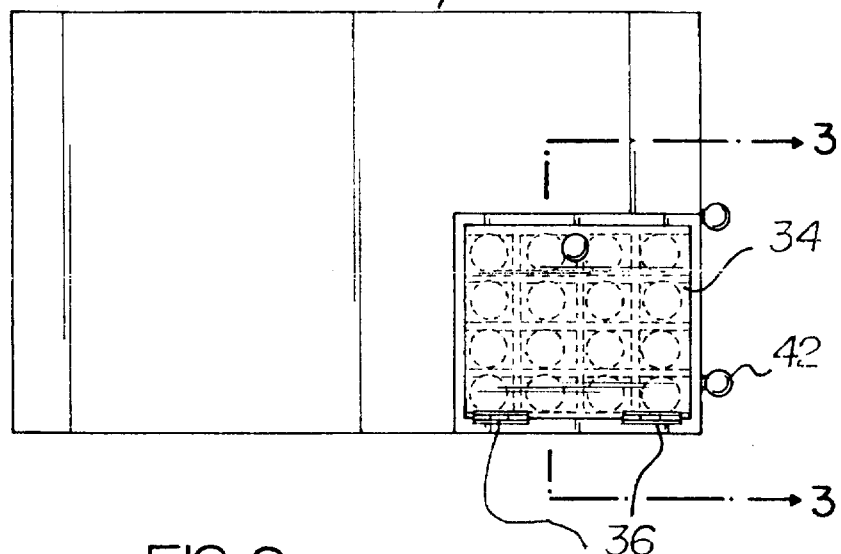
FIG. 2 is a side view thereof.
Figure 4:
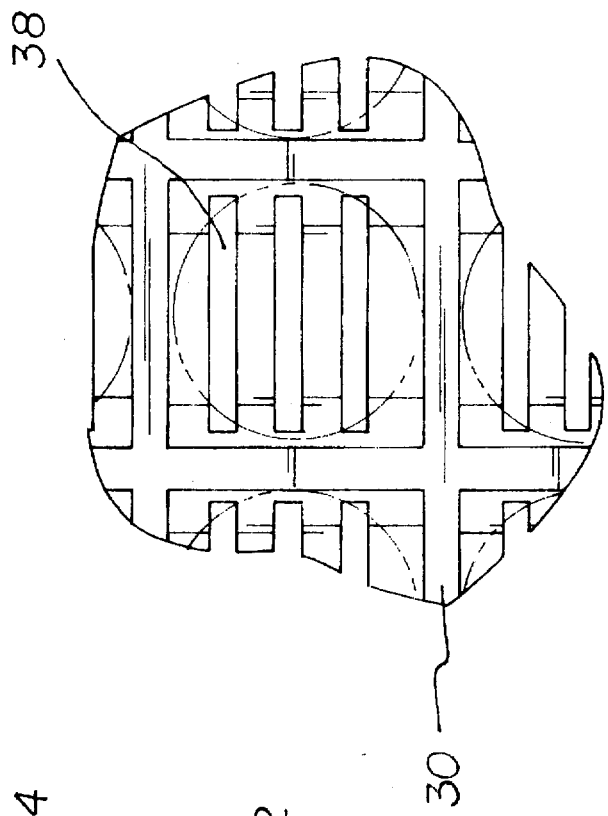
FIG. 4 is a cross sectional view taken along line 4—4 of FIG. 3 disclosing the cooling vents.
Figure 3:
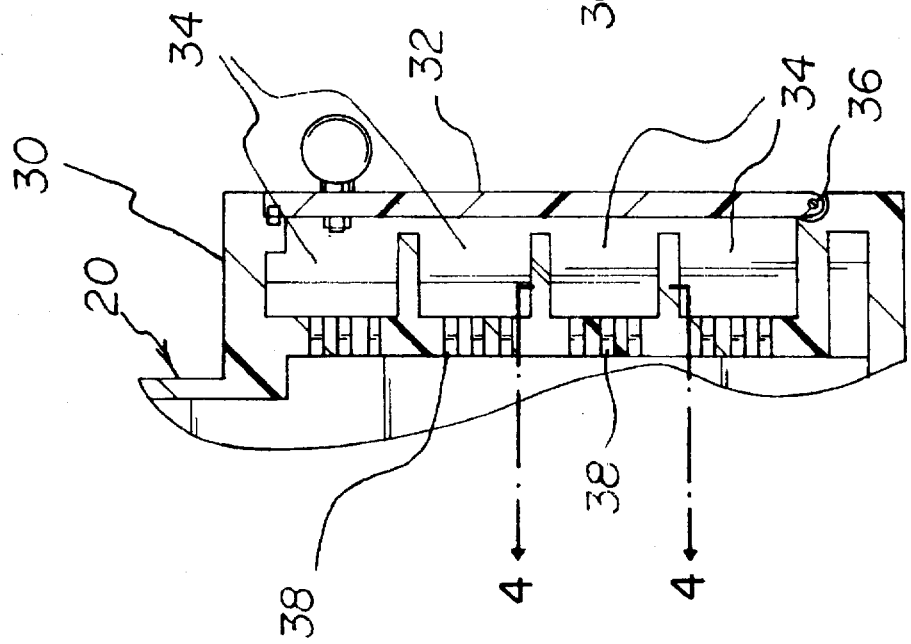
FIG. 3 is a cross sectional view take along line 3—3 of FIG. 2 disclosing the interior portion of ice cartridge storage body.
Figure 5:
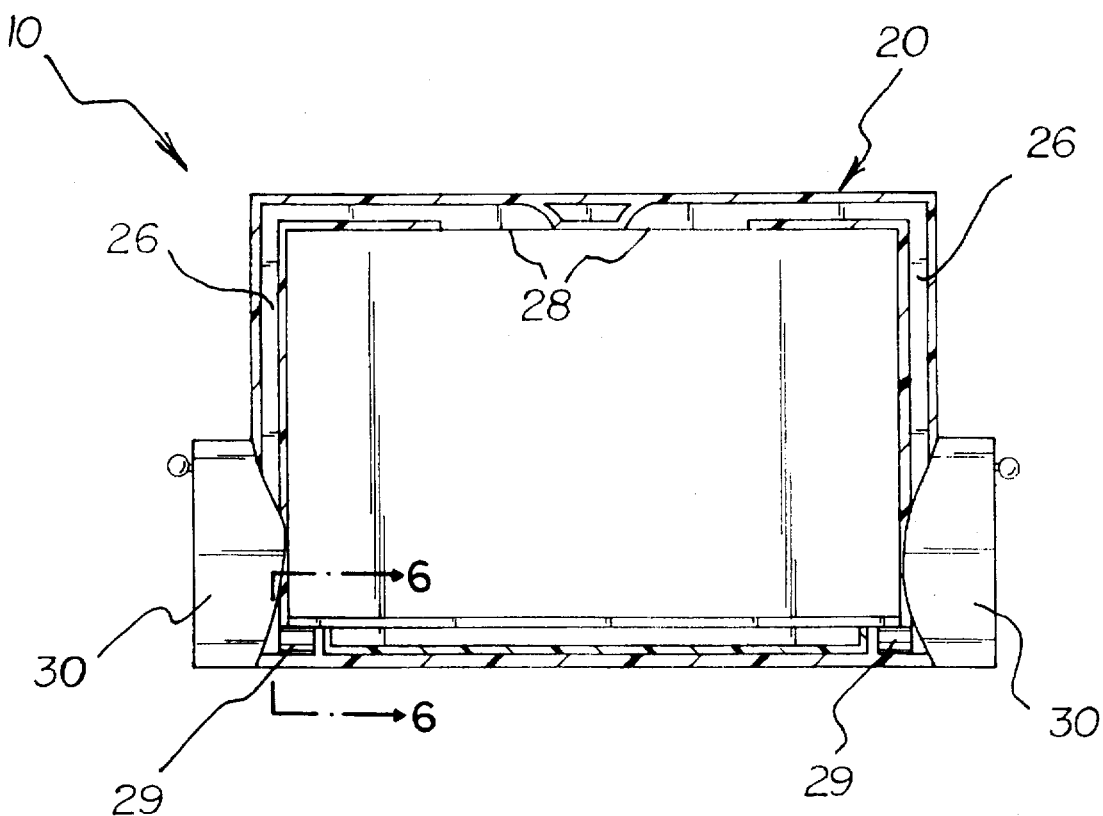
FIG. 5 is a cross sectional view take along line 3—3 of FIG. 1 disclosing the interior portion of kennel structure.
Figure 6:
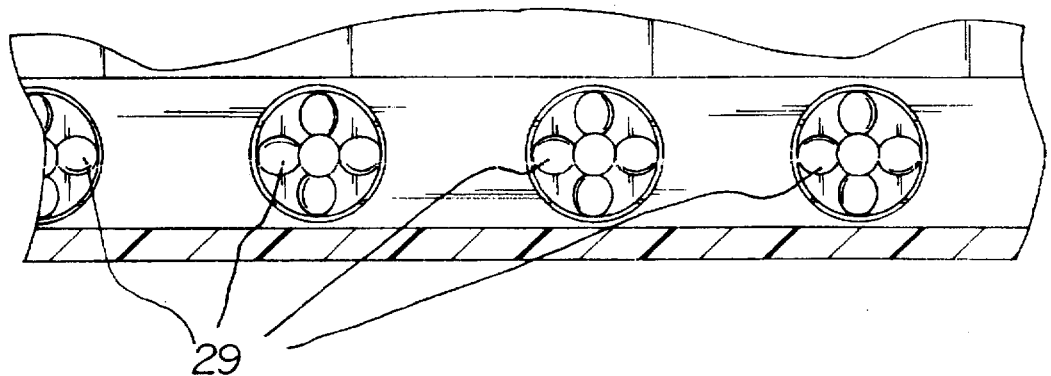
FIG. 6 is a cross sectional view taken along line 6—6 of FIG. 5 disclosing the plurality of fans.

With reference now to the drawings, and in particular to FIGS. 1 through 6 thereof, a new Portable Cooling Kennel System embodying the principles and concepts of the present invention and generally designated by the reference numeral 10 will be described.

More specifically, it will be noted that the Portable Cooling Kennel System 10 comprises a kennel structure 20, at least one ice cartridge storage body 30 secured to the exterior side of the kennel structure 20, and a sliding ice tray 40 slidably positioned within the lower portion of the kennel structure 20.

As best illustrated in FIGS. 1 through 6, it can be shown that the kennel structure 20 includes a kennel door 22 pivotally secured to the frontal portion of the kennel structure 20. The floor of the kennel structure 20 includes a plurality of air return vents 24 which connect fluidly the interior portion of the kennel structure 20 and the sliding ice tray 40 as best shown in FIG. 1 of the drawings. At least one fan 29 is fluidly connected to the interior portion of the sliding ice tray 40 forcing air though a cool air passage 26 which projects along the side wall of the kennel structure 20 thereby engaging the interior portion of the kennel structure 20 through at least one ceiling air outlet 28 as best disclosed in FIG. 5 of the drawings. The ice cartridge storage body 30 includes an ice door 32 pivotally attached to the ice cartridge storage body 30 by a plurality of hinges 36. A plurality of ice cartridge cells 34 which retain ice cartridges are positioned within the ice cartridge storage body 30. The interior wall includes a plurality of cooling vents 38 projecting into the cool air passage 26. The sliding ice tray 40 includes a handle 42 secured toward the central exterior portion. The sliding ice tray 40 further preferably includes a plurality of unnumbered dry ice.

In use, the user positions unnumbered dry ice within the sliding ice tray 40. The fan 29 draws air through the air return vents 24 across the unnumbered dry ice thereafter forcing the cooled air through the cool air passage 26 whereby it is further cooled through the ice cartridge storage body 30 containing unnumbered frozen ice. The cooled air is then projected into the interior portion of the kennel structure through the ceiling air outlets 28 connected to the cool air passage 26 thereby cooling the air temperature from within the kennel structure 20 maintaining the pet's comfort.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Portable Cooling Kennel System comprising:

a kennel structure having an exterior side, a lower portion, an interior portion, an interior ceiling, an interior floor, and a cool air passage;

said cool air passage being projected within a side wall of said kennel structure;

said interior ceiling having at least one ceiling air outlet fluidly connecting said cool air passage and said interior portion of said kennel structure;

at least one ice cartridge storage body secured to the exterior side of the kennel structure, said ice cartridge storage body being in fluid communication with said cool air passage, said ice cartridge storage body being for receiving at least one ice cartridge;

a sliding ice tray having an interior portion and being slidably positioned within the lower portion of the kennel structure;

said interior floor of said kennel structure including a plurality of air return vents fluidly connecting said interior portion of said kennel structure and said sliding ice tray; and at least one fan fluidly connecting the interior portion of said sliding ice tray and said cool air passage, said fan being for forcing air from said interior of said kennel structure through said air return vents into said interior portion of said sliding ice tray and though said cool air passage and expelling the air from said cool air passage into said interior of said kennel structure through said ceiling air outlet.

2. The Portable Cooling Kennel System of claim 1, wherein the ice cartridge storage body includes:

an interior wall being positioned adjacent said kennel structure;

an ice door pivotally attached to the ice cartridge storage body;

a plurality of ice cartridge cells each said ice cartridge cell being, for retaining an ice cartridge; and the interior wall includes a plurality of cooling vents projecting into the cool air passage.

3. The Portable Cooling Kennel System of claim 2, wherein the sliding ice tray includes a handle secured toward the central exterior portion.

4. The Portable Cooling Kennel System of claim 3, wherein the sliding ice tray includes a plurality of dry ice.

5. The portable cooling kennel system of claim 2, wherein said ice cartridge cells are positioned along said interior wall of said ice cartridge storage body in a grid-like arrangement, wherein said interior wall of said ice cartridge storage body has a said cooling vent for each said ice cartridge cell, each said cooling vent being aligned with a said ice cartridge cell to fluidly connect each said ice cartridge cell to said cool air passage of said kennel structure.

6. The portable cooling kennel system of claim 2, wherein said ice cartridge cells are rectangular.

7. The portable cooling kennel system of claim 5, wherein there are a pair of ice cartridge storage bodies being provided on the exterior of said kennel structure.

8. The portable cooling kennel system of claim 1, wherein said fan is positioned at said lower portion of said kennel structure.

9. A Portable Cooling Kennel System comprising;

a kennel structure having an exterior side, a lower portion, an interior portion, an interior ceiling, an interior floor, and a cool air passage;

said cool air passage being projected within a side wall of said kennel structure;

said interior ceiling having at least one ceiling air outlet fluidly connecting said cool air passage and said interior portion of said kennel structure;

an ice cartridge storage body being provided on the exterior of said kennel structure, said ice cartridge storage body having a hollow interior with an interior wall being positioned adjacent said kennel structure, said ice cartridge storage body being for receiving at least one ice cartridge within said hollow interior of said ice cartridge storage body;

said ice cartridge storage body having an ice door pivotally attached to said ice cartridge storage body to provide access to said hollow interior of said ice cartridge storage body;

a plurality of rectangular ice cartridge cells for retaining ice cartridges being provided within said hollow interior of said ice cartridge storage body, said ice cartridge cells being positioned along said interior wall of said ice cartridge storage body in a grid-like arrangement, each said ice cartridge cell being for receiving a ice cartridge;

said interior wall of said ice cartridge storage body having a cooling vent for each of said ice cartridge cells, each said cooling vent being aligned with a said ice cartridge cell to fluidly connect each said ice cartridge cell to said cool air passage of said kennel structure; and a sliding ice tray having an interior portion and being slidably positioned within the lower portion of the kennel structure;

said interior floor of said kennel structure including a plurality of air return vents fluidly connecting said interior portion of said kennel structure and said sliding ice tray; and a fan being positioned at said lower portion of said kennel structure, said fan fluidly connecting the interior portion of said sliding ice tray and said cool air passage, said fan being for forcing air from said interior of said kennel structure through said air return vents, into said interior portion of said sliding ice tray, though said cool air passage and said ice cooling structure, and expelling the air from said cool air passage into said interior of said kennel structure through said ceiling air outlet.

\* \* \* \* \*